United States Patent [19]

Oishi et al.

[11] Patent Number: 4,497,009
[45] Date of Patent: Jan. 29, 1985

[54] MAGNETIC DISK CARTRIDGE

[75] Inventors: Kengo Oishi; Osamu Suzuki, both of Odawara, Japan

[73] Assignee: Fuji Photo Film Co., Ltd., Minamiashigara, Japan

[21] Appl. No.: 568,150

[22] Filed: Jan. 4, 1984

[30] Foreign Application Priority Data

Jan. 11, 1983 [JP] Japan ............................ 58-1943[U]
Jan. 18, 1983 [JP] Japan ............................ 58-5056[U]
Jan. 18, 1983 [JP] Japan ............................ 58-5057[U]
Jan. 18, 1983 [JP] Japan ............................ 58-5058[U]

[51] Int. Cl.³ .......................................... G11B 23/02
[52] U.S. Cl. ...................................... 360/133; 360/97
[58] Field of Search .......................... 360/132–133, 360/97–99, 137, 86, 105; 242/198–199; 206/444

[56] References Cited

U.S. PATENT DOCUMENTS

| 4,120,012 | 10/1978 | Bowers | 360/133 |
| 4,131,199 | 12/1978 | Hatchett et al. | 360/133 X |
| 4,320,430 | 3/1982 | Vogt | 360/97 X |
| 4,399,480 | 8/1983 | Edwards | 360/105 X |

Primary Examiner—John H. Wolff
Attorney, Agent, or Firm—Pasquale A. Razzano

[57] ABSTRACT

In a magnetic disk cartridge, a guide member is positioned on a lower half of the cartridge. The guide member has a guide surface standing face to face with a part of a guide groove extending in the surface of the lower half. The guide surface restrains upward movement of a link member coupled with shutter members for magnetic head insertion apertures of the cartridge after the lower side edge portion of the link member is fitted to the guide groove of the lower half when the cartridge is assembled. To prevent the aperture opening movement of the link member, a lock member or a stop wall portion is positioned at a side wall portion of the cartridge.

9 Claims, 12 Drawing Figures

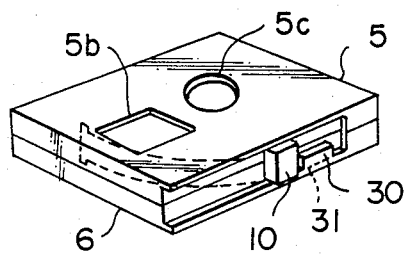
FIG. 7
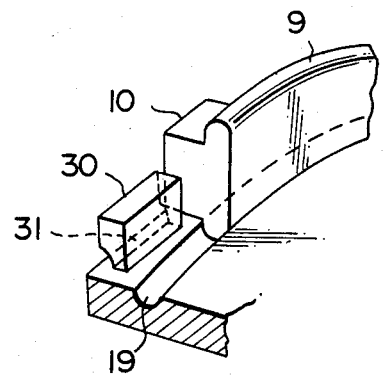
FIG. 8
FIG. 9B  FIG. 9C
FIG. 9A
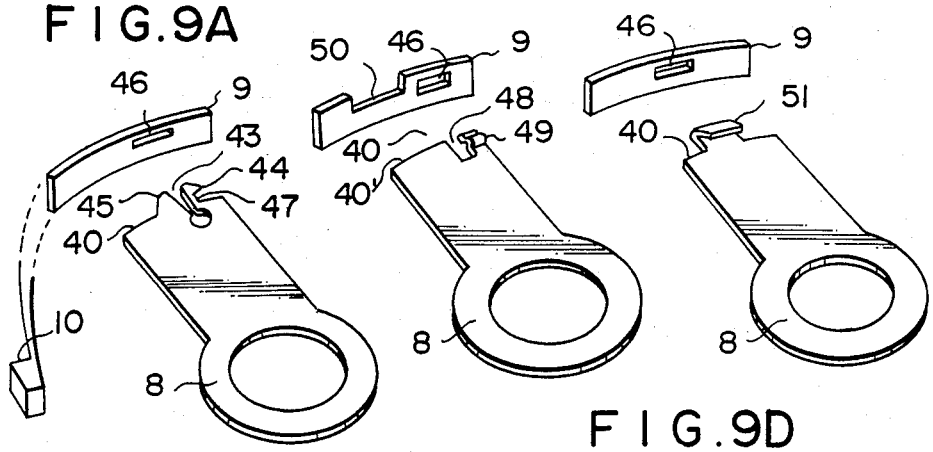
FIG. 9D
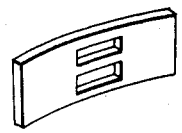

MAGNETIC DISK CARTRIDGE

BACKGROUND OF THE INVENTION

1. Field of the Invention

This invention relates to a magnetic disk cartridge. This invention particularly relates to a magnetic disk cartridge comprising a small-diameter, very thin magnetic disk which is rotated at a high speed for recording and reproducing of image information or the like.

2. Description of the Prior Art

Floppy disks are widely used as recording media for computers because of easiness of handling and low costs. The floppy disk comprises a disk-like base made of a flexible polyester sheet or the like, and magnetic material layers overlaid on opposite surfaces of the disk-like base. The floppy disk is rotated at a high speed for magnetically recording information in the magnetic material layers by use of a magnetic head.

On the other hand, by utilizing the aforesaid advantages of the floppy disks and the advantages of a magnetic recording medium over silver halide photographic films that the magnetic recording medium can be re-used, it has been proposed to use a magnetic disk having a size smaller than the size of the floppy disks as an image recording medium in still cameras. The magnetic disk used for still cameras comprises a small-diameter, very thin magnetic recording medium, and a hub secured to the center of the magnetic recording medium. The magnetic disk is rotatably housed in a small-size, hard case having a hub hole for exposing the hub of the magnetic disk at the center of the front surface of the case, and magnetic head insertion apertures for exposing a part of the magnetic disk in the front surface and the rear surface of the case. The combination of the magnetic disk and the case is called a magnetic disk cartridge.

When video signals are magnetically recorded by use of the aforesaid magnetic recording medium, since the frequency band of the video signals is very broad as compared with the frequency bands of digital signals and audio signals, the magnetic recording is conducted at a high recording density. Therefore, in the case where the magnetic layers for recording the signals therein have fine dust, small protrusions or recesses, flaws, peelings, or the like, the drop-out phenomenon in which the signals recorded are not reproduced correctly due to signal attenuation arises.

However, since the magnetic disk cartridge is usually carried and used outdoors, there is a risk of dust entering from the apertures of the cartridge for insertion of a magnetic head and clinging to the surfaces of the recording medium. Also, the portion of the recording medium exposed to the outside at the magnetic head insertion apertures is readily damaged due to contact with external materials.

To eliminate the above-described problems, the cartridge of the aforesaid type has heretofore been provided with shutter members for closing the magnetic head insertion apertures to protect the magnetic disk and opening the apertures at the recording and reproducing steps. Typicaly, the conventional shutter members are positioned between the case of the cartridge and the magnetic disk housed in the case, and rotatably supported on engagement portions positioned at the center of the case. The shutter members are engaged with one end portion of an elongated strip-like link member the other end portion of which is exposed to the outside of the case. When the link member is operated from outside of the case and moved, the shutter members are rotated by the link member to open or close the magnetic head insertion apertures. (In many cases, the shutter members are normally urged by an urging means in the closing direction, and rotated in the opening direction by the movement of the link member.)

The aforesaid link member must not come into contact with the magnetic disk housed in the case of the cartridge. Therefore, usually, a pair of guide grooves are extended in face-to-face relation to each other in the inner surfaces of upper and lower halves constituting the case. The upper and lower side edge portions of the link member are engaged with the guide grooves, and the link member is moved along the guide grooves. As described above, the link member is fabricated in the elongated strip-like shape so that the link member can be accommodated in a small space in the cartridge. However, since the link member has the elongated strip-like shape, it adversely affects the cartridge assembling efficiency. That is, when the cartridge is assembled, the lower side edge portion of the strip-like link member is first engaged with the guide groove of the lower half of the case positioned with the inner side facing up. Thus the link member is erected on the guide groove of the lower half. Then, the upper half of the case is mounted on the lower half from above the lower half so that the upper side edge portion of the link member is engaged with the guide groove of the upper half. In this manner, the link member is supported in the case. However, when the link member is erected on the guide groove of the lower half, the link member is readily disengaged from the guide groove even by small shocks.

SUMMARY OF THE INVENTION

The primary object of the present invention is to provide a magnetic disk cartridge which securely protects the magnetic disk from dust and damage.

Another object of the present invention is to provide a magnetic disk cartridge which exhibits a high assembling efficiency.

The magnetic disk cartridge in accordance with the present invention comprises a guide member provided on a lower half of the cartridge and having a guide surface standing face to face with a part of a guide groove of the lower half for restraining upward movement of a link member the lower side edge portion of which is engaged with the guide groove of the lower half.

The magnetic disk cartridge in accordance with the present invention securely protects the magnetic disk from dust and damage. Further, since the upward movement of the link member is restrained by the guide member, the link member does not disengage from the guide groove of the lower half of the cartridge even when the link member receives shocks, but instead maintains the correct position erected on the guide groove at the cartridge assembling step. Therefore, the cartridge assembling efficiency is markedly improved.

The guide member may be, and should preferably be fabricated integrally with the lower half of the cartridge. Since the lower half is normally made of a plastic material, the guide member should preferably be made of a plastic material integrally therewith. In this case, when the lower side edge portion of the link member is engaged with the guide groove of the lower half, the guide member is resiliently deflected to allow the engagement of the link member with the guide groove.

BRIEF DESCRIPTION OF THE DRAWINGS

FIG. 7 is a perspective view showing the appearance of the magnetic disk cartridge of FIG. 6 in the assembled condition, FIG. 8 is a partially sectional perspective view showing the stop wall portion for restraining the longitudinal movement of the link member in the embodiment of FIG. 6, FIGS. 9A, 9B, and 9C are developed perspective views showing modified forms of the portions of engagement of the link member and the shutter member with each other in the magnetic disk cartridge in accordance with the present invention, and FIG. 9D is a perspective view showing a modified form of the portion of engagement of the link member with the shutter members in the magnetic disk cartridge in accordance with the present invention.

DESCRIPTION OF THE PREFERRED EMBODIMENTS

The present invention will hereinbelow be described in further detail with reference to the accompanying drawings.

Figure 1:
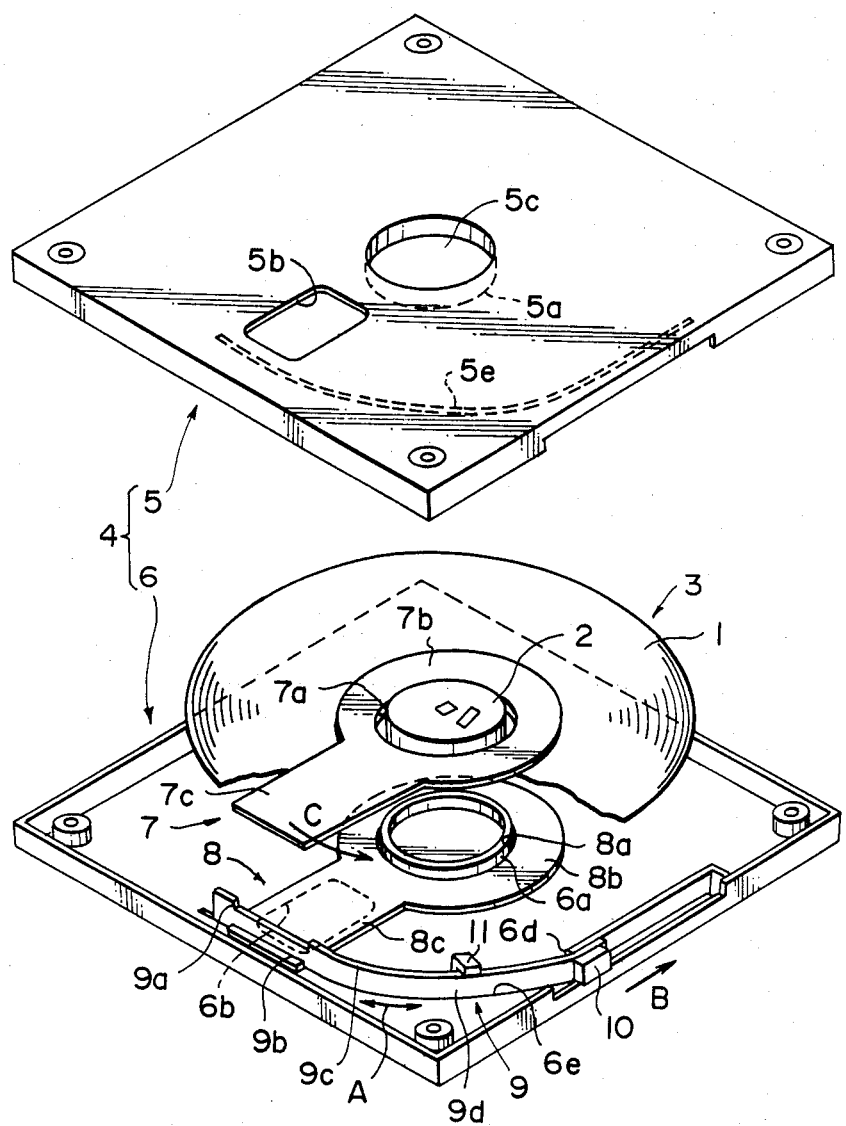
FIG. 1 is a developed perspective view showing an embodiment of the magnetic disk cartridge in accordance with the present invention.

Referring to FIG. 1, the magnetic disk cartridge in accordance with the present invention comprises a magnetic disk 3 and a case 4 for housing the magnetic disk 3. The magnetic disk 3 consists of a thin, flexible disk-like magnetic recording medium 1 and a hub 2 secured to the center of the magnetic recording medium 1. The magnetic recording medium 1 comprises a very thin base, e.g. a polyester sheet having a thickness of 50 $\mu$m or less, and magnetic material layers overlaid on opposite surfaces of the base by coating, deposition, sputtering, or the like. The case 4 consists of an upper half 5 and a lower half 6 which are adapted to be coupled integrally with each other by screwing, ultrasonic fusion, or the like. The inner surface of the lower half 6 (i.e. the upper side thereof in the drawing) is provided at its center with a cylindrical engagement portion 6a projecting upwardly therefrom. Also, the inner surface of the upper half 5 (i.e. the lower side thereof in the drawing) is provided with an engagement portion 5a having the same shape as the shape of the engagement portion 6a and standing face to face with the engagement portion 6a. The wall portion of the upper half 5 inside the engagement portion 5a is removed to form a circular hub hole 5c. The halves 5 and 6 are respectively provided with magnetic head insertion apertures 5b and 6b positioned in face-to-face relation to each other for exposing the magnetic recording medium 1 of the magnetic disk 3 to the outside of the case 4.

A shutter member 7 is positioned above the magnetic disk 3, and a shutter member 8 is positioned below the magnetic disk 3. The shutter member 7 comprises a ring-like portion 7b defining a circular engagement hole 7a, and a shutter portion 7c extending outwardly from the ring-like portion 7b and having a size adapted for closing the head insertion aperture 5b of the half 5. Similarly, the shutter member 8 comprises a ring-like portion 8b defining a circular engagement hole 8a, and a shutter portion 8c extending outwardly from the ring-like portion 8b and having a size adapted for closing the head insertion aperture 6b of the half 6. The shutter members 7 and 8 are rotatably supported on the engagement portions 5a and 6a, respectively, through the engagement of the engagement holes 7a and 8a with the engagement portions 5a and 6a. The magnetic disk 3 is rotatable supported on the engagement portions 5a and 6a with the oppsite sides of the hub 2 fitted into the engagement portions 5a and 6a.

The shutter portions 7c and 8c of the shutter members 7 and 8 are engaged near the outer ends thereof with a strip-like link member 9 made of a resilient material such as a thin plastic strip. One end potion of the link member 9 is secured to a contact piece 10 and exposed to the outside of the case 4 at a notch 6d thereof. The other end portion of the link member 9 is provided with notches 9a and 9b for engagement with the shutter portions 7c and 8c of the shutter members 7 and 8. An upper side edge portion 9c and a lower side edge portion 9d of the link member 9 are respectively engaged with guide grooves 5e and 6e extending in face-to-face relation to each other in the inner surfaces of the upper half 5 and the lower half 6. Thus, the link member 9 can be moved in the direction of the arrow A along the guide grooves 5e and 6e.

The shutter members 7 and 8 are urged by an urging means (not shown) to the positions where the shutter portions 7c and 8c respectively close the head insertion apertures 5b and 6b as shown in FIG. 1. The urging means may be of any type usually employed in cartridges of this type. By closing the head insertion apertures 5b and 6b as described above, it is possible to prevent the magnetic recording medium 1 of the magnetic disk 3 from dust and damage.

When the above-described cartridge is loaded into a recording and reproducing apparatus such as a still camera, the contact piece 10 comes into contact with a contact portion of the recording and reproducing apparatus, and is moved by the contact portion in the direction of the arrow B. As a result, the link member 9 secured to the contact piece 10 is moved together with the contact piece 10, and the shutter members 7 and 8 are thereby rotated in the direction of the arrow C to open the head insertion apertures 5b and 6b. After the head insertion apertures 5b and 6b are opened, it becomes possible for the magnetic head of the recording and reproducing apparatus to pass through the apertures 5b and 6b and contact the magnetic recording medium 1. Then, the magnetic disk 3 is rotated at a high speed by a rotation shaft of the recording and reproducing apparatus, which is engaged with the hub 2 via the hub hole 5c, and information is recorded in the magnetic disk 3 or reproduced therefrom by use of the magnetic head.

Figure 2:
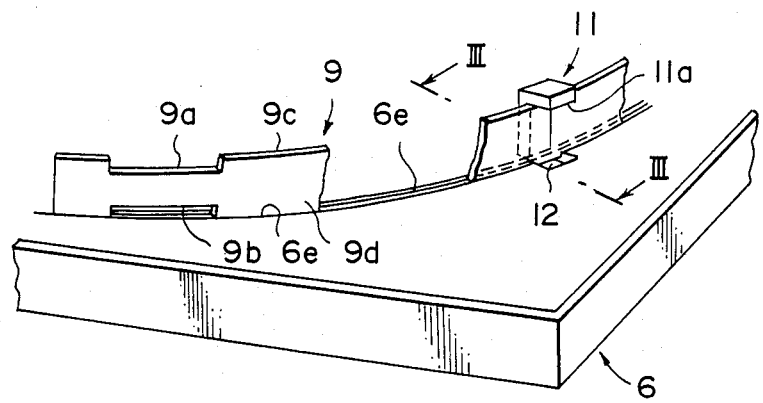
FIG. 2 is a partially cutaway enlarged view showing a part of the magnetic disk cartridge shown in FIG. 1.
Figure 3:
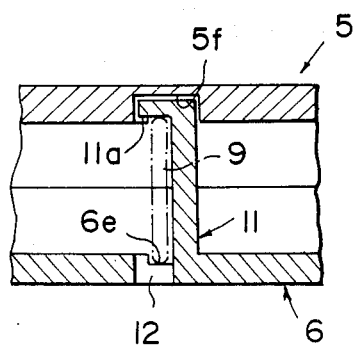
FIG. 3 is a sectional view taken on line III—III of FIG. 2.

When the cartridge is assembled, the lower side edge portion 9d of the link member 9 for moving the shutter members 7 and 8 is fitted to and erected on the guide groove 6e of the lower half 6 as shown in FIG. 1. Though the link member 9 has a strip-like shape as described above, since a guide member 11 is positioned on the lower half 6, the link member 9 is not readily disengaged from the guide groove 6e during assembling of the cartridge. The guide member 11 will hereinafter be described in detail with reference to FIGS. 2 and 3. FIG 2 is a partially cutaway enlarged view showing the guide member 11 and the vicinity thereof, and FIG. 3 is a sectional view taken on line III—III of FIG. 2. As shown in FIGS. 2 and 3, the guide member 11 is fabricated integrally with the lower half 6 made of a plastic material, and positioned at a point adjacent to the guide groove 6e. The upper end portion of the guide member is projected or bent laterally over the guide groove 6e so that the lower surface (i.e. the guide surface) 11a of the laterally projected end portion stands face to face with a portion of the guide groove 6e. As best shown in FIG. 3, the height of the guide surface 11a is predetermined so that, when the lower side edge portion 9d of the link member 9 is engaged with the guide groove 6e, the upper side edge portion 9c of the link member 9 slightly contacts the guide surface 11a. In this embodiment, the guide member 11 is made of a plastic material as described above. Therefore, when the lower side edge portion 9d of the link member 9 is engaged with the guide groove 6e, the guide member 11 is resiliently deflected to allow the engagement of the link member 9 with the guide groove 6e.

When the lower side edge portion 9d of the link member 9 is fitted to the guide groove 6e and the upper side edge portion 9c of the link member 9 is contacted with the guide surface 11a, the upward movement of the link member 9 is restricted by the guide surface 11a. Therefore, even when holding of the link member 9 by an external holding means is released, the link member 9 is maintained in the condition erected on the guide groove 6e. Also, even when the link member 9 receives some levels of shocks, it does not become disengaged or brought down from the guide groove 6e. Thereafter, the upper half 5 is mounted on the lower half 6 from above thereof so that the upper side edge portion 9c of the link member 9 fits into the guide groove 5e of the upper half 5. In this manner, the link member 9 is correctly held in the case 4. At this time, the upper end portion of the guide member 11 is accommodated in a recess 5f formed in the inner surface of the upper half 5. An aperture 12 is formed for extracting a mold portion for forming the undercut portion of the guide member 11.

In the embodiment as described above, the guide surface 11 is constituted by a flat plane. However, it is also possible to form a groove matching the guide groove 5e of the upper half 5 at the same position as the guide surface 11a, thereby to use the bottom surface of the groove as the guide surface. Also in this case, when the guide member is fabricated integrally with the lower half 6 made of a plastic material, the guide member is resiliently deflected to allow engagement of the upper side edge portion 9c of the link member 9 with the groove of the guide member.

In the above-described embodiment, the shutter members 7 and 8 are urged by an urging means to the positions where the shutter portions 7c and 8c respectively close the head insertion apertures 5b and 6b. In this case, however, in order to assure that the shutter members 7 and 8 are prevented from being moved by mistake to the aperture opening positions when the cartridge is conveyed or stored, it is advantageous to install a lock member for preventing the movement of the link member 9 coupled with the shutter members 7 and 8.

Figure 4:
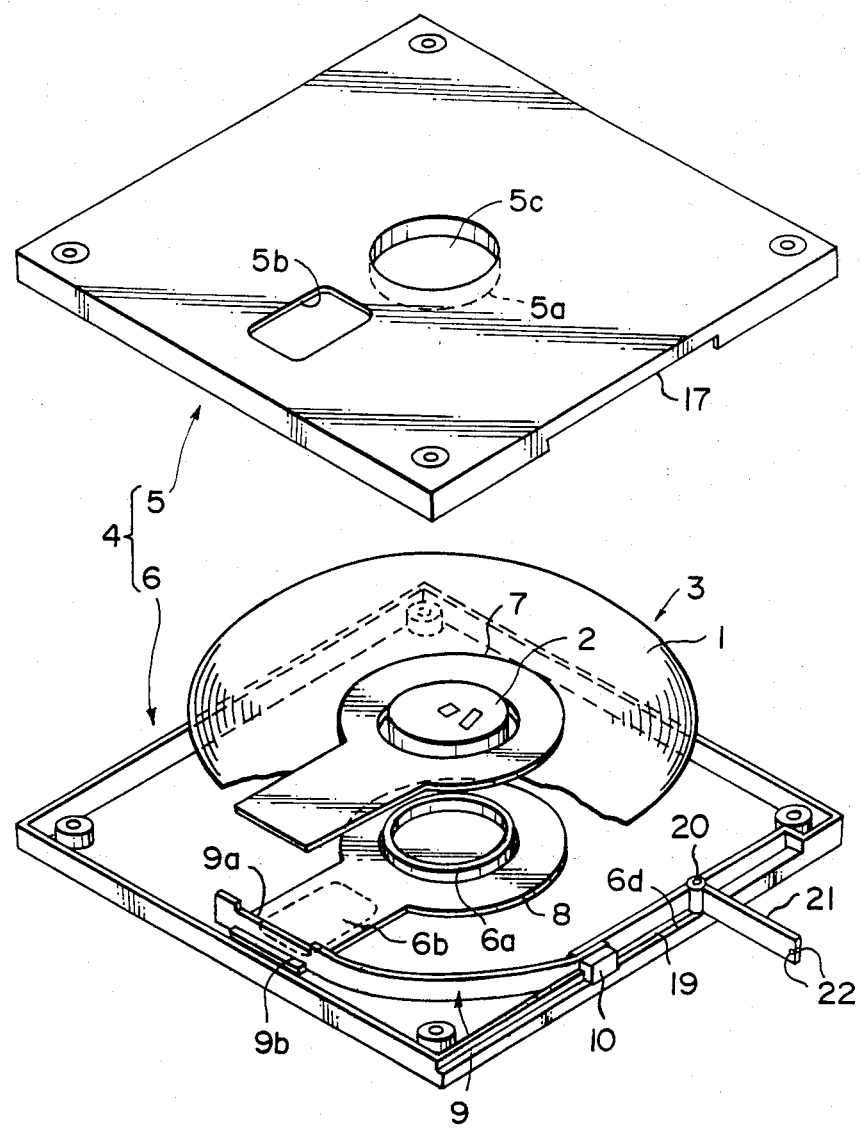
FIG. 4 is a developed perspective view showing another embodiment of the magnetic disk cartridge in accordance with the present invention.
Figure 5:
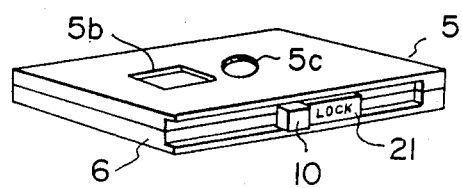
FIG. 5 is a perspective view showing the appearance of the magnetic disk cartridge of FIG. 4 in the assembled condition.

FIGS. 4 and 5 show an embodiment of the magnetic disk cartridge in accordance with the present invention, which is provided with a lock member as described above. In this embodiment, a supporting shaft 20 is positioned near an end potion of a guide groove 19 formed in the notch 6d of the case 4 for guiding the link member 9. A lock member 21 is rotatably supported on the supporting shaft 20. Thus the lock member 21 can be rotated towards the contact piece 10 of the link member 9 and the end face of the lock member 21 can be contacted with a side face of the contact piece 10, thereby to lock the shutter members 7 and 8 in the positions closing the head insertion apertures 5b and 6b via the link member 9. In this condition, a word "LOCK" is indicated on the outer side face of the lock member 21, and a word "UNLOCK" is indicated on the inner side face thereof. In the front end face of the lock member 21 is formed a notch 22 for facilitating the opening and closing operations of the lock member 21.

When the cartridge shown in FIGS. 4 and 5 is used for recording and reproducing, the lock member 21 is rotated by 180° to the side opposite to the contact piece 10 and held in the case 4. The contact piece 10 is then moved rightwardly to rotate the shutter members 7 and 8 via the link member 9 and thereby to open the head insertion apertures 5b and 6b. When the cartridge is conveyed or stored, the contact piece 10 is moved leftwardly and the lock member 21 is rotated by 180° towards the contact piece 10 until the end face of the lock member 21 contacts the side face of the contact piece 10. Thus, the shutter members 7 and 8 are rotated to the positions closing the head insertion apertures 5b and 6b via the link member 9, and securely locked at said positions by the lock member 21 in contact with the contact piece 10. In this embodiment, therefore, there is no risk of the shutter members 7 and 8 being moved by mistake to open the head insertion apertures 5b and 6b during the conveying and storage of the cartridge. Further, since the words "LOCK" and "UNLOCK" are indicated respectively on the front surface and the rear surface of the lock member 21, it is possible to clarify the condition of the shutter members 7 and 8.

Figure 6:
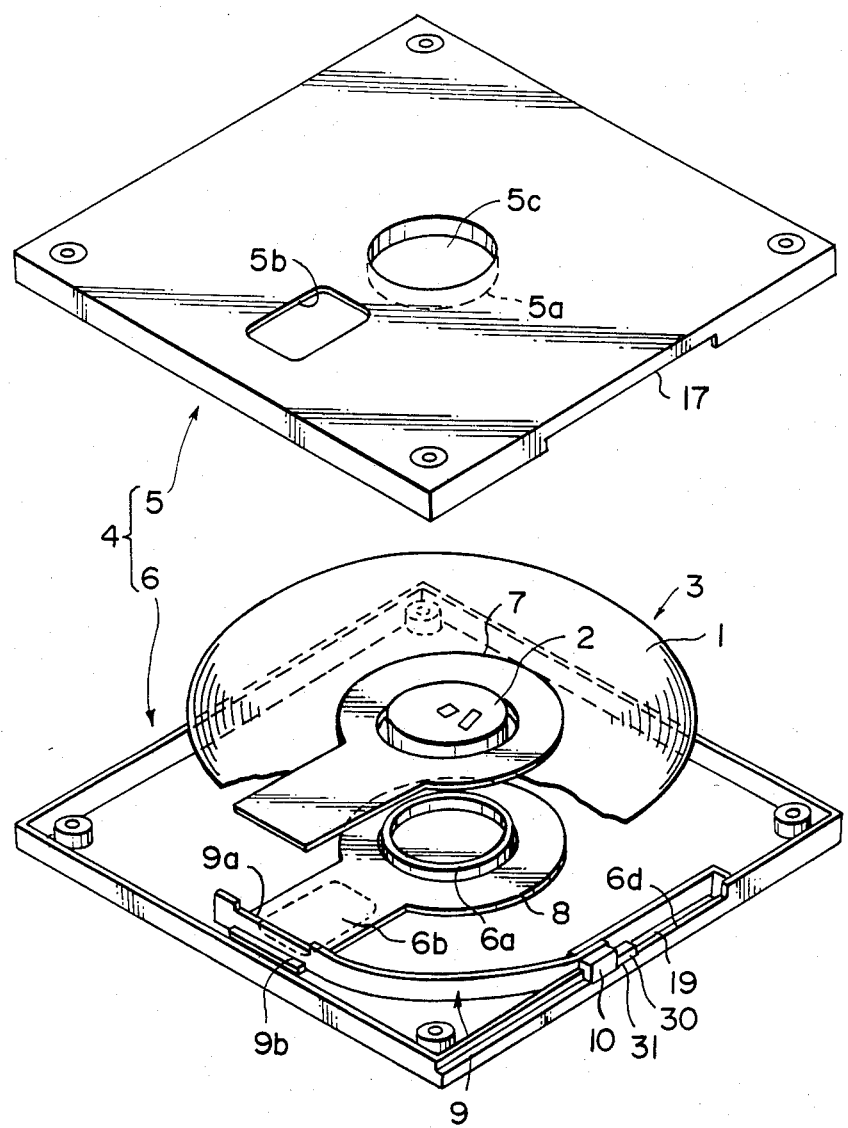
FIG. 6 is a developed perspective view showing a further embodiment of the magnetic disk cartridge in accordance with the present invention.

FIGS. 6, 7 and 8 show another embodiment of the magnetic disk cartridge in accordance with the present invention, in which a stop wall portion is positioned to prevent the link member 9 from being moved by mistake before the cartridge is used for recording and reproducing. In this embodiment, a stop wall portion 30 is positioned integrally with the lower half 6 at a part on the surface of the notch 6d between the guide groove 19 and the outer wall surface of the cartridge. The stop wall portion 30 is in contact with the contact piece 10 to prevent the link member 9 from moving. A notch 31 is formed at the base portion of the stop wall portion 30, i.e. at the boundary between the stop wall portion 30 and the lower half 6, so that the stop wall portion 30 can be cut out easily along the notch 31.

In the embodiment of FIGS. 6, 7 and 8, before the cartridge is used for recording and reproducing, the stop wall potion 30 is in contact with the contact piece 10 to prevent the link member 9 from moving. Therefore, even when the cartridge receives shocks or vibrations during conveying and storage of the cartridge, the shutter members 7 and 8 do not move and the head insertion apertures 5b and 6b are not opened. When the cartridge is used for recording and reproducing, the stop wall portion 30 is cut out along the notch 31 formed at the base portion of the stop wall portion 30, and the link member 9 is moved rightwardly along the guide groove 19 to open the head insertion apertures 5b and 6b. In this embodiment, since the existence of the stop wall portion 30 in the cartridge indicates that the cartridge has not been used for recording and reproducing, it is possible to easily discriminate a fresh cartridge from an already used cartridge.

In the embodiment of FIGS. 6, 7 and 8, instead of the notch 31, perforations may be formed at the base portion of the stop wall portion 30. The stop wall portion 30 may also be formed at a symmetrical position on the surface of a notch 17 of the upper half 5. Further, since protrusions or recesses will remain at the boundary between the stop wall portion 30 and the lower half 6 after the stop wall portion 30 is cut out, the cartridge should preferably be constructed so that there is a gap between the lower face of the link member 9 and the cut face of the lower half 6, and the link member 9 can smoothly move over the cut face.

In the above-described embodiments, the outer end portions of the shutter members 7 and 8 are simply fitted to the notches 9a and 9b formed in the link member 9. However, in order to securely couple the shutter members 7 and 8 with the link member 9 and thereby to further improve the assembling efficiency, a clamp portion having such a shape that the clamp portion can be inserted into a slot of the link member 9 but cannot be drawn out of the slot of the link member 9 after the clamp portion is inserted thereinto may be formed at a part of the outer end portion of each shutter member. FIGS. 9A, 9B, 9C and 9D show such modified forms of engagement portions of the link member and the shutter member.

In FIG. 9A, a notch 43 is formed at a part of an outer end portion 40 of the shutter member 8. A hook portion 44 is formed on one side of the notch 43, and a protrusion 45 is formed on the opposite side of the notch 43. The hook portion 44 can be resiliently deflected in the direction normal to the plate thickness of the shutter member 8. The resilient deflection of the hook portion 44 can be realized easily by selecting the material of the shutter member 8. On the other hand, the link member 9 is provided with a through slot 46 in the position standing face to face with the hook portion 44 and the protrusion 45 of the shutter member 8. The width of the slot 46 is approximately equal to the plate thickness of the shutter member 8, and the length of the slot 46 is slightly shorter than the distance between the outer side of the hook portion 44 in the normal position before insertion and the outer side of the protrusion 45. Since the hook portion 44 can be deflected resiliently, the hook portion 44 and the protrusion 45 can be inserted and fitted into the slot 46. After the insertion, the hook portion 44 returns to the normal position, and a constricted section 47 formed at the base of the hook portion 44 fits to the side face of the slot 46. Therefore, the shutter member 8 is prevented from being disengaged from the link member 9.

In FIG. 9B, a notch 48 is formed at a part of the end portion 40 of the shutter member 8, and a U-shaped bent portion 49 is positioned on one side of the notch 48. The bent portion 49 is inserted into the through slit 46 of the link member 9, and the recess of the U-shaped bent portion 49 is fitted to the plate thickness part of the link member 9 under the slot 46. The link member 9 is also provided with a notch 50 having approximately the same width as the width of an end portion 40' formed on the side of the notch 48 opposite to the bent portion 49. When the bent portion 49 is inserted into the through slit 46, the end portion 40' also fits to the notch 50 to assure engagement of the shutter member 8 with the link member 9.

In FIG. 9C, a part of the end portion 40 of the shutter member 8 is folded in the plate thickness direction of the shutter member 8 to form a folded portion 51. The through slit 46 of the link member 9 has approximately the same width as the width of the folded portion 51. The folded portion 51 is resiliently constricted and inserted into the through slit 46. After the insertion, the folded portion 51 returns to the original condition to prevent the shutter member 8 from being disengaged from the link member 9.

When both shutter members 7 and 8 are clamped to the link member 9 as described above, two through slits 46 are formed one above the other in the link member 9 as shown in FIG. 9D, and the shutter members 7 and 8 are fitted to the through slits 46.

We claim:

1. A magnetic disk cartridge comprising a case consisting of an upper half and a lower half, a magnetic disk, means for rotatably supporting said magnetic disk in said case, a strip-like link member positioned for movement along guide grooves extending in face-to-face relation to each other in inner surfaces of said upper half and said lower half, opposite side edge portions of said strip-like link member being engaged with said guide grooves, and shutter members operated by said strip-like link member for opening and closing magnetic head insertion apertures of said case, wherein the improvement comprises a guide member on said lower half projecting upwardly from said lower half towards said upper half, said guide member having a guide surface standing face to face with a part of said guide groove of said lower half for restraining upward movement of said link member the lower side edge portion of which is engaged with said guide groove of said lower half.

2. A magnetic disk cartridge as defined in claim 1 wherein said guide member is fabricated integrally with said lower half.

3. A magnetic disk cartridge as defined in claim 1 wherein said guide member is made of a resilient material.

4. A magnetic disk cartridge as defined in claim 1 wherein a lock member for preventing the movement of said link member is positioned at a side wall portion of said case.

5. A magnetic disk cartridge as defined in claim 4 wherein said lock member is rotatably supported on a supporting shaft positioned near an end portion of a guide groove formed at said side wall portion of said case for guiding said link member.

6. A magnetic disk cartridge as defined in claim 1 wherein a wall portion for preventing the movement of said link member is positioned along an outer wall surface of said cartridge between a guide groove for guiding said link member and said outer wall surface of said cartridge.

7. A magnetic disk cartridge as defined in claim 6 wherein said wall portion for preventing the movement of said link member is adapted to be cut out from the outside of said cartridge.

8. A magnetic disk cartridge as defined in claim 6 or 7 wherein a notch or perforations for facilitating the cutting-out of said wall portion are formed at a base portion of said wall portion.

9. A magnetic disk cartridge as defined in any of claims 1 to 7 wherein a clamp portion is formed at a part of an outer end portion of at least one of said shutter members, and a through slot for fitting to said clamp portion is formed in said link member, said clamp portion having such a shape that the clamp portion can be inserted into said slot in one direction but cannot be drawn out of said slot.

* * * * *